US010545783B2

(12) United States Patent
Dewan et al.

(10) Patent No.: US 10,545,783 B2
(45) Date of Patent: Jan. 28, 2020

(54) TECHNOLOGIES FOR SECURING DATA STRUCTURES FOR CONTROLLING VIRTUAL MACHINES (71) Applicant: Intel Corporation, Santa Clara, CA (US)

(72) Inventors: Prashant Dewan, Portland, OR (US); Siddhartha Chhabra, Portland, OR (US); Uttam Sengupta, Portland, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 16/108,453

(22) Filed: Aug. 22, 2018

(65) Prior Publication Data
US 2019/0042296 A1 Feb. 7, 2019

(51) Int. Cl.
G06F 9/455 (2018.01)
G06F 9/46 (2006.01)
G06F 9/30 (2018.01)
H04L 9/32 (2006.01)

(52) U.S. Cl.
CPC ...... *G06F 9/45558* (2013.01); *G06F 9/30018* (2013.01); *G06F 9/30145* (2013.01); *G06F 9/468* (2013.01); *H04L 9/3247* (2013.01); G06F 2009/45583 (2013.01); G06F 2009/45587 (2013.01); G06F 2009/45591 (2013.01)

(58) Field of Classification Search
CPC .................................................. G06F 9/45558
See application file for complete search history.

(56) References Cited

U.S. PATENT DOCUMENTS

| 8,528,107 B1* | 9/2013 | Ginzton | G06F 21/6281 |
| | | | 726/29 |
| 2010/0281273 A1* | 11/2010 | Lee | G06F 21/72 |
| | | | 713/190 |
| 2016/0132345 A1* | 5/2016 | Bacher | G06F 9/45558 |
| | | | 718/1 |

OTHER PUBLICATIONS

David Kaplan; "Protecting VM Register State With SEV-ES"; Advanced Micro Devices, Inc.; Feb. 17, 2017.
"Intel® 64 and IA-32 Architectures, Software Developer's Manual, vol. 3 (3A, 3B, 3C & 3D): System Programming Guide"; May 2018; Intel Corporation.

(Continued)

*Primary Examiner* — Charlie Sun
(74) *Attorney, Agent, or Firm* — Trop, Pruner & Hu, P.C.

(57) ABSTRACT

A data processing system with technology to secure a virtual machine control data structure (VMCDS) comprises random access memory (RAM) and a processor in communication with the RAM. The processor comprises virtualization technology that enables the processor to run a virtual machine monitor (VMM) in the data processing system and to run guest software in a virtual machine (VM) that is managed by the VMM. The VM is based at least in part on a VMCDS for the VM. An instruction decoder in the processor recognizes and dispatches a set-mask instruction. The set-mask instruction specifies access restrictions to be imposed on the VMM with respect to the VMCDS of the VM. The processor also comprises a mask enforcer to automatically enforce the access restrictions specified by the set-mask instruction, in response to an attempt by the VMM to access the VMCDS of the VM. Other embodiments are described and claimed.

20 Claims, 4 Drawing Sheets

(56) References Cited

OTHER PUBLICATIONS

"Intel® Architecture Memory Encryption Technologies Specification"; Rev: 1.1; Dec. 2017.
Shay Gueron; "A Memory Encryption Engine Suitable for General Purpose Processors"; Intel Corporation; Feb. 25, 2016.
Baiju Patel; "Intel Releases New Technology Specification for Memory Encryption"; Dec. 22, 2017.
U.S. Appl. No. 15/633,259, filed Jun. 26, 2017, entitled "Technologies for Protecting Virtual Machine Memory" by Prashant Dewan et al.

* cited by examiner

TECHNOLOGIES FOR SECURING DATA STRUCTURES FOR CONTROLLING VIRTUAL MACHINES

TECHNICAL FIELD

The present disclosure pertains in general to computer security and in particular to technologies for securing data structures for controlling virtual machines.

BACKGROUND

A data processing system may use virtual machines (VMs) to provide distinct execution environments for distinct software stacks. In particular, a VM provides an execution environment that allows a software stack to execute within that environment as if the software stack were executing within an independent data processing system. The software for managing VMs within a data processing system may be referred to as a hypervisor or a virtual machine monitor (VMM). A data processing system that executes a VMM may be referred to as a host. By contrast, the contents of a VM may be referred to as a guest.

A machine that provides VMs may receive the software stacks for those VMs from other machines at different locations. For instance, a server device that provides VMs may receive a software stack from a remote client device, and the server device may then run that software stack within a VM, on behalf of the client device. An entity that operates such server devices may be referred to as a cloud-service provider (CSP) or VM-service provider (VMSP). Likewise, an entity that operates such client devices may be referred to as a cloud-service consumer (CSC) or VM-service consumer (VMSC). Also, a server device that provides VMs to execute software stacks from client devices may be referred to as a cloud server or a VM server, and the corresponding client devices may be referred to as cloud clients or VM clients. In addition, the software stack from a VM client may be referred to as guest software, and the VM within which the guest software executes may be referred to as a guest VM.

In a VM server with a VMM managing a VM, the VMM has access to the processor state of the VM. For instance, the VMM may use a virtual machine control structure (VMCS) to store data such as guest operating system (OS) state, host OS state, and various types of control and VM exit information. The VMM can also control the execution path of the guest software in the VM. The VMM may read from and write to the VMCS in conjunction with entering or exiting that VM. The VMM may also control the interrupts that the VM receives.

However, if the VMM has been compromised or hacked, the VMM may modify the VMCS in a way that causes the VM to operate improperly. For instance, by modifying data in the VMCS pertaining to guest OS state, the VMM may alter the course of execution of the VM without the permission of the VM. As an example, the VMM can read the processor state of the VM, modify that state, and force the VM to go in single-stepping debug mode.

BRIEF DESCRIPTION OF THE DRAWINGS

Features and advantages of the present invention will become apparent from the appended claims, the following detailed description of one or more example embodiments, and the corresponding figures, in which:

DETAILED DESCRIPTION

As explained in the September 2016 edition of the Intel® 64 and IA-32 Architectures, Software Developer's Manual, Volume 3C: System Programming Guide, Part 3 (hereinafter, "SDM"), a processor may include technology that supports virtualization of processor hardware for multiple software environments. Such technology may be referred to as virtualization technology or virtual-machine extensions (VMX). VMX may support two principal classes of software: VMMs and guest software. According to the SDM, a "VMM acts as a host and has full control of the processor(s) and other platform hardware. A VMM presents guest software . . . with an abstraction of a virtual processor and allows it to execute directly on a logical processor. A VMM is able to retain selective control of processor resources, physical memory, interrupt management, and I/O."

Also, with regard to guest software, the SDM explains as follows: "Each [VM] is a guest software environment that supports a stack consisting of [OS] and application software. Each operates independently of other [VMs] and uses the same interface to processor(s), memory, storage, graphics, and I/O provided by a physical platform. The software stack acts as if it were running on a platform with no VMM."

Also, with regard to VMX operation, root operation, and non-root operation, the SDM explains as follows: "Processor support for virtualization is provided by a form of processor operation called VMX operation. There are two kinds of VMX operation: VMX root operation and VMX non-root operation. In general, a VMM will run in VMX root operation and guest software will run in VMX non-root operation. Transitions between VMX root operation and VMX non-root operation are called VMX transitions. There are two kinds of VMX transitions. Transitions into VMX non-root operation are called VM entries. Transitions from VMX non-root operation to VMX root operation are called VM exits." For purposes of this disclosure, VMX root operation may also be referred to as root mode, and VMX non-root operation may be referred to as non-root mode.

The SDM also explains that processor behavior in root mode "is very much as it is outside VMX operation. The principal differences are that a set of new instructions (the VMX instructions) is available and that the values that can be loaded into certain control registers are limited."

With regard to the overall life cycle of VMM software and individual VMs, the SDM explains as follows: The VMM "enters VMX operation by executing a VMXON instruction." The VMM can then use "VM entries" to "enter guests into [VMs] (one at a time). The VMM effects a VM entry using instructions VMLAUNCH and VMRESUME; it regains control using VM exits. VM exits transfer control to an entry point specified by the VMM. The VMM can take action appropriate to the cause of the VM exit and can then return to the [VM] using a VM entry. Eventually, the VMM may decide to shut itself down and leave VMX operation. It does so by executing the VMXOFF instruction."

With regard to the VMCS, the SDM explains that (a) "VMX non-root operation and VMX transitions are controlled by a data structure called a [VMCS]" and (b) access to the VMCS is "managed through a component of processor state called the VMCS pointer (one per logical processor)." Additionally, the "value of the VMCS pointer is the 64-bit address of the VMCS," and the VMCS pointer is "read and written using the instructions VMPTRST and VMPTRLD," respectively. In particular, the VMM only allows one VMCS to be "current" at a time on a logical processor, and the VMM uses VMPTRLD to set the VMCS at the specified address as the current VMCS on the logical processor. The VMM may then configure the current VMCS using the VMREAD, VMWRITE, and VMCLEAR instructions. Thus, the VMM may use VMPTRLD to enable editing of the current VMCS. In one embodiment, the VMCS is opaque to the VMM, in that the processor and the memory controller do not allow the VMM to directly read or write the VMCS using memory read or write instructions. Instead, the VMM can only access fields of the VMCS by using VM instructions such as VMREAD and VMWRITE. Consequently, additional security fields could be added to future versions of the VMCS without impacting legacy compatibility. In addition, the SDM explains that a VMM "could use a different VMCS for each [VM] that it supports. For a [VM] with multiple logical processors (virtual processors), the VMM could use a different VMCS for each virtual processor."

Each VM has its own set of one or more VMCSs, with one VMCS for each virtual processor. In other words, the VMM maintains a different set of VMCSs for each guest VM. Each VMCS includes a guest state area (GSA), a host state area (HSA), and other fields or areas. With every change of the execution context into a VM (i.e., when the VM server enters the VM), the VMM uses the GSA of the VMCS for that VM to restore the state of that VM's virtual processor. When the execution context switches from the guest VM back to the host VMM (i.e., when the VM server exits the VM), the VMM uses the HSA of the same VMCS to restore the host's processor state.

A VM server may provide for protection of memory associated with a VM. For instance, technology for protecting memory associated with a VM is described in U.S. patent application Ser. No. 15/633,259, entitled "Technologies For Protecting Virtual Machine Memory" with inventors Prashant Dewan et al. and a filing date of Jun. 26, 2017. That application may be referred to as the VM Memory Protection (VMMP) application. According to the VMM' application, a VMM in a VM server allocates a range of physical addresses in random access memory (RAM) to a VM. The VMM also generates translation mappings for translating guest linear addresses to host physical addresses (HPAs) that reside within the allocated range of memory. The translation mappings that the VMM generates may be referred to as the original translation mappings.

If the VMM in a conventional VM server were to be compromised or hacked, the VMM might modify the translation mappings of a VM and thereby cause the VM to operate improperly. By contrast, the VMMP application discloses a VM server with a memory manager that (a) reserves a secured memory region of the host physical address space and (b) uses that secured memory region to store a known-good copy of the original translation mappings for the VM. The copy of the translation mappings that resides in the secured memory region constitutes the secure translation cache. That secured memory region is not accessible to the VMM or to the VM. For example, a memory mapper security controller may ensure that the host physical address space of the secure translation cache cannot be mapped by the VMM or the VM. In some embodiments, the secured memory region may be established in a secured container or other security provision. A VM server may use any suitable technology or combination of technologies to provide for secured memory regions. Those technologies may include, without limitation, technologies provided by Intel Corporation under any of the following trademarks or tradenames: Intel® Virtualization Technology (VT), Intel® Trusted Execution Technology (TXT), Intel® Memory Encryption Engine (MEE), Intel® Multiple Key Total Memory Encryption (MKTME), and Intel® MKTME with Integrity (MKTMEi). Since the secure translation cache is not accessible to the VMM, even if the VMM were to be maliciously compromised or hacked, the secure translation cache would not be affected. The memory manager uses the secure translation cache to ensure that subsequent memory address translations do not differ from the known-good translations.

Another risk associated with conventional VM servers arises because a VMM in a conventional VM server may modify the VMCS for a VM in conjunction with entering or exiting that VM. And as indicated above, a VMM that has been compromised or hacked may modify the VMCS in a way that causes the VM to operate improperly. For instance, by modifying data in the GSA of the VMCS, a malicious VMM may alter the course of operation of the guest software in the VM.

The present disclosure describes technology for preventing software such as a VMM from making unauthorized changes to data structures such as VMCSs.

Figure 1:
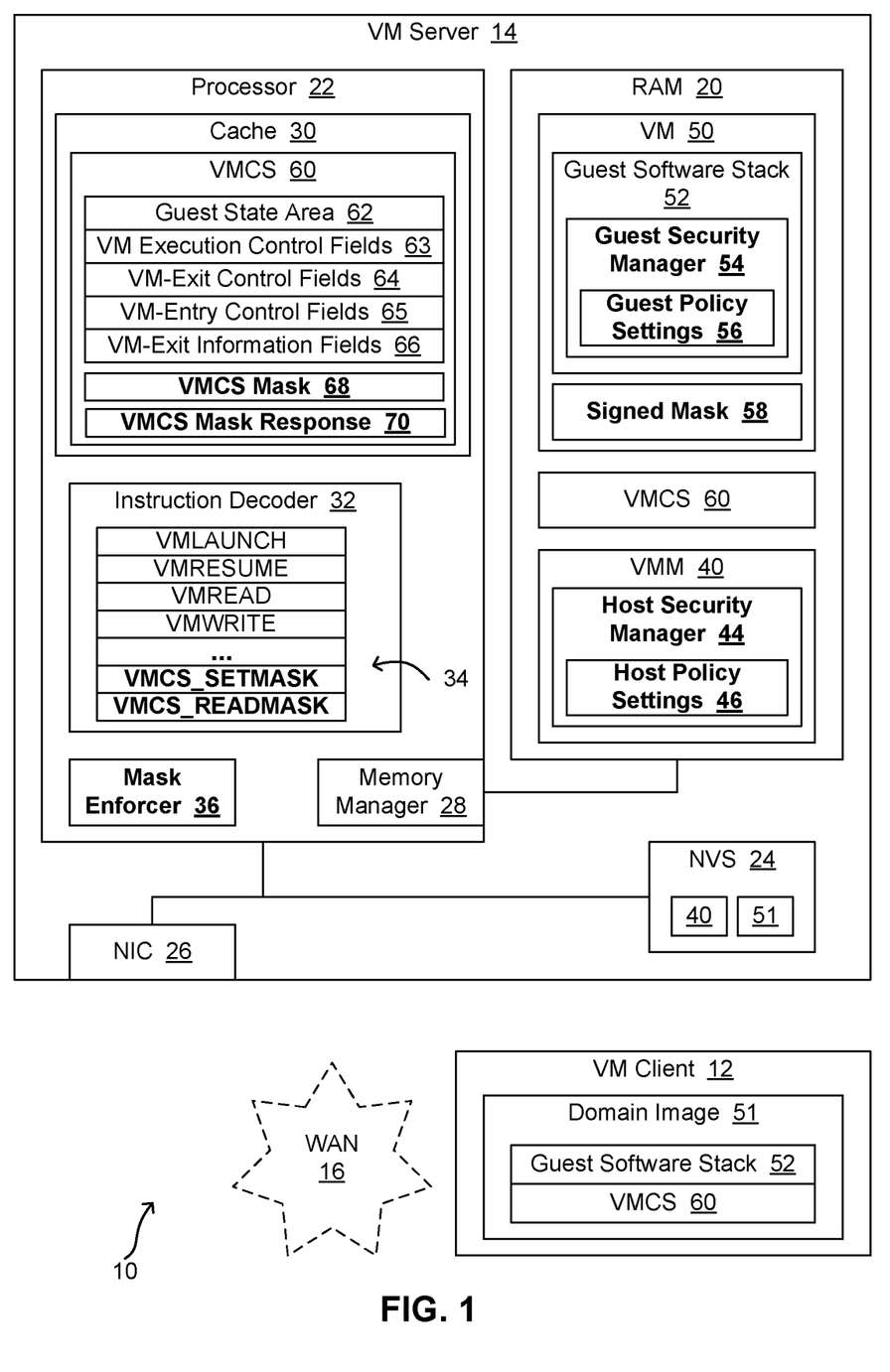
FIG. 1 is a block diagram of an example embodiment of a distributed data processing system with technology for securing data structures for controlling VMs.

FIG. 1 is a block diagram of an example embodiment of a distributed data processing system 10 with technology for securing data structures for controlling VMs. In the illustrated embodiment, distributed data processing system 10 includes a VM client 12 that communicates with a VM server 14 via a wide area network (WAN) 16 such as the Internet. In other embodiment or scenarios, VM clients may communicate with VM servers via other types of networks, such as local area network (LAN), or via a combination of different types of networks. A CSP or VMSP may use a data processing system such as VM server 14 to provide VMs to execute software stacks from CSCs or VMSCs. Accordingly, a VMSC may use a data processing system such as VM client 12 to send a software stack (and related information) to VM server 14 for execution in a VM. For instance, in the embodiment of FIG. 1, VM client 12 includes a domain image 51 which includes a guest software stack 52 and a VMCS 60, and VM client 12 sends domain image 51 to VM server 14 via WAN 16 to enable VM server 14 to execute guest software stack 52 on behalf of VM client 12. In particular, VM server 14 executes guest software stack 52 in a VM (e.g., VM 50) that is based on VMCS 60. However, as indicated above, in other scenarios, a VM with multiple virtual processors may have a different VMCS for each virtual processor.

In the embodiment of FIG. 1, VM server 14 includes a processor 22 in communication with RAM 20, nonvolatile storage (NVS) 24, and a network interface controller (NIC) 26. Also, processor 22 includes a memory manager 28, cache memory 30, an instruction decoder 32, and a mask enforcer 36. Instruction decoder 32 decodes the instructions 34 that are supported by the architecture of processor 34 and dispatches each decoded instruction to an appropriate execution unit for execution. Mask enforcer 36 prevents host software in VM server 14 from making unauthorized access to VMCSs such as VMCS 60. Accordingly, mask enforcer 36 may also be referred to as a VMCS access control module or a VMCS access control circuit. Additional details on an instruction decoder 32 and mask enforcer 36 are provided below.

In other embodiments, VM servers may use processors with multiple cores, and each core may support multiple threads, each of which executes on a single logical processor. However, for ease of understanding, the embodiment of FIG. 1 presents a relatively simple hardware environment. Similarly, a VM server may include many additional hardware components, including additional components within the processor; however, for ease of understanding, such components are not depicted in FIG. 1. VM client 12 may also include any suitable hardware components, such as a processor, RAM, a NIC, etc.

In the embodiment of FIG. 1, VM server 14 receives domain image 51 from VM client 12 via NIC 26, and VM server 14 then stores domain image 51 in NVS 24. NVS 24 also includes a VMM 40, which is host software for managing guest VMs for client devices such as VM client 12. VM server 14 may copy VMM 40 from NVS 24 into RAM 20 for execution. As described in greater detail below with regard to FIGS. 2A and 2B, VMM 40 may then create VM 50 and load guest software stack 52 into VM 50.

Guest software stack 52 includes the software for performing the primary work desired by the VMSC who controls VM client 12. Guest software stack 52 also includes control logic for specifying access restrictions to control or limit the ability of VMM 40 to access VMCS 60. In the embodiment of FIG. 1, such control logic is illustrated as a guest security manager 54. Also, the fields within VMCS 60 include a field for storing those access restrictions. In the embodiment of FIG. 1, that field is illustrated as a VMCS mask 68 within VMCS 60.

VMM 40 includes control logic for managing such access restrictions. In the embodiment of FIG. 1, such control logic is illustrated as a host security manager 44. As described in greater detail below, in response to VM 50 setting VMCS mask 68, host security manager 44 automatically determines whether the access restrictions are acceptable to VMM 40. If they are not acceptable, host security manager 44 may propose alternative access restrictions. In the embodiment of FIG. 1, host security manager 44 writes those alternative access restrictions into a VMCS field that is illustrated as a VMCS mask response 70. Guest security manager 54 may then automatically determine whether the alternative access restrictions are acceptable to VM 50.

Figure 3:
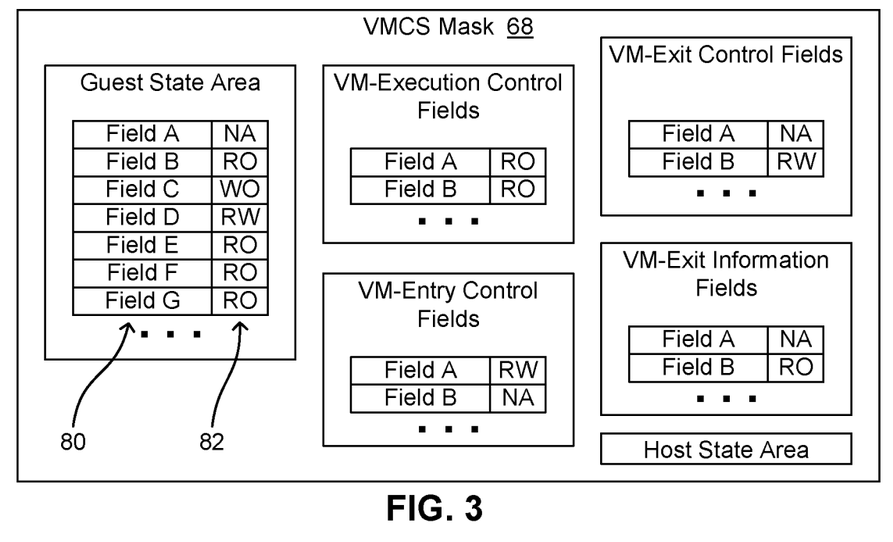
FIG. 3 is a block diagram depicting an example embodiment of the VMCS mask of FIG. 1 from a first perspective.
Figure 4:
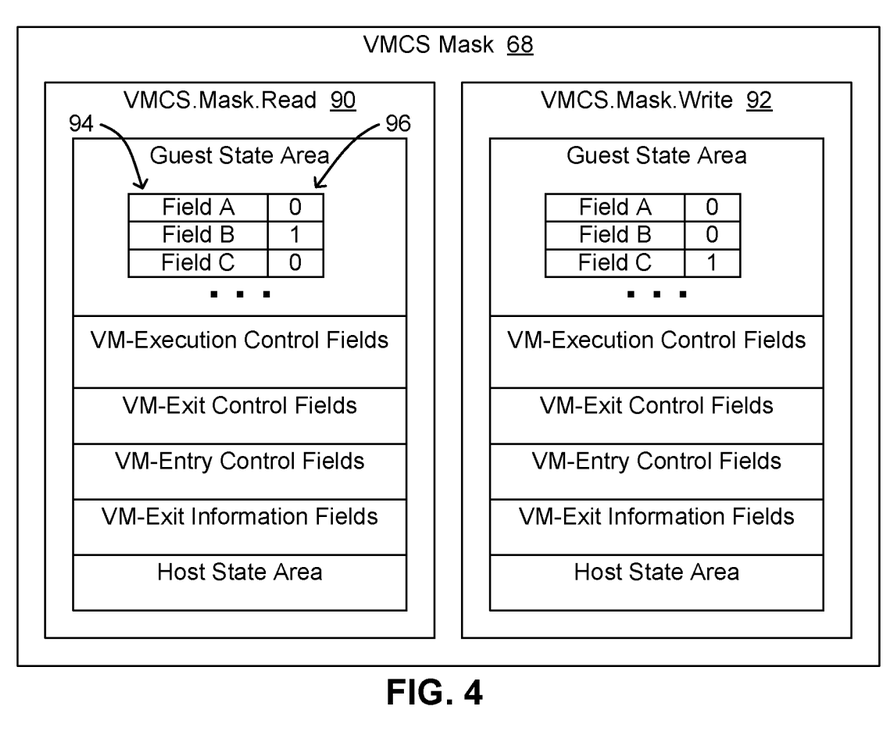
FIG. 4 is a block diagram depicting an example embodiment of the VMCS mask of FIG. 1 from a second perspective.

Each data structure or field such as VMCS mask 68 may include multiple fields or subfields. For instance, as shown in FIGS. 3 and 4, VMCS mask 68 may include intermediate-level fields which correspond to different areas of a VMCS (e.g., the GSA, the VM-Execution Control Fields, the HSA, etc.), and each of those intermediate-level fields may include lower-level fields which correspond to particular fields or groups of fields within the relevant area of the VMCS (e.g., guest register state fields within the GSA, guest non-register state fields within the GSA, etc.). And so on. Also, VMCS mask response 70 may include some or all of the same fields as VMCS mask 68.

If guest security manager 54 and host security manager 44 reach agreement on the access restrictions, mask enforcer 36 in processor 22 then enforces those access restrictions whenever VMM 40 attempts to access VMCS 60. If agreement is not reached, VM 50 may terminate itself.

Processor 22 includes hardware support for creating and enforcing access restrictions to control or limit access to VMCS 60 by VMM 40. For instance, instruction decoder 32 provides for an instruction to be used by VM 50 to set VMCS mask 68. In the embodiment of FIG. 1, such an instruction is illustrated as a VMCS_SETMASK instruction. In addition, instruction decoder 32 provides for an instruction to be used by VM 50 to generate a digitally signed version of the agreed access restrictions. In the embodiment of FIG. 1, such an instruction is illustrated as a VMCS_CERTIFYMASK instruction, and the digitally signed version of the agreed access restrictions is illustrated as a signed mask 58. VM 50 may use signed mask 58 to provide proof of trustworthiness.

Additional details are provided below.

Figure 2A:
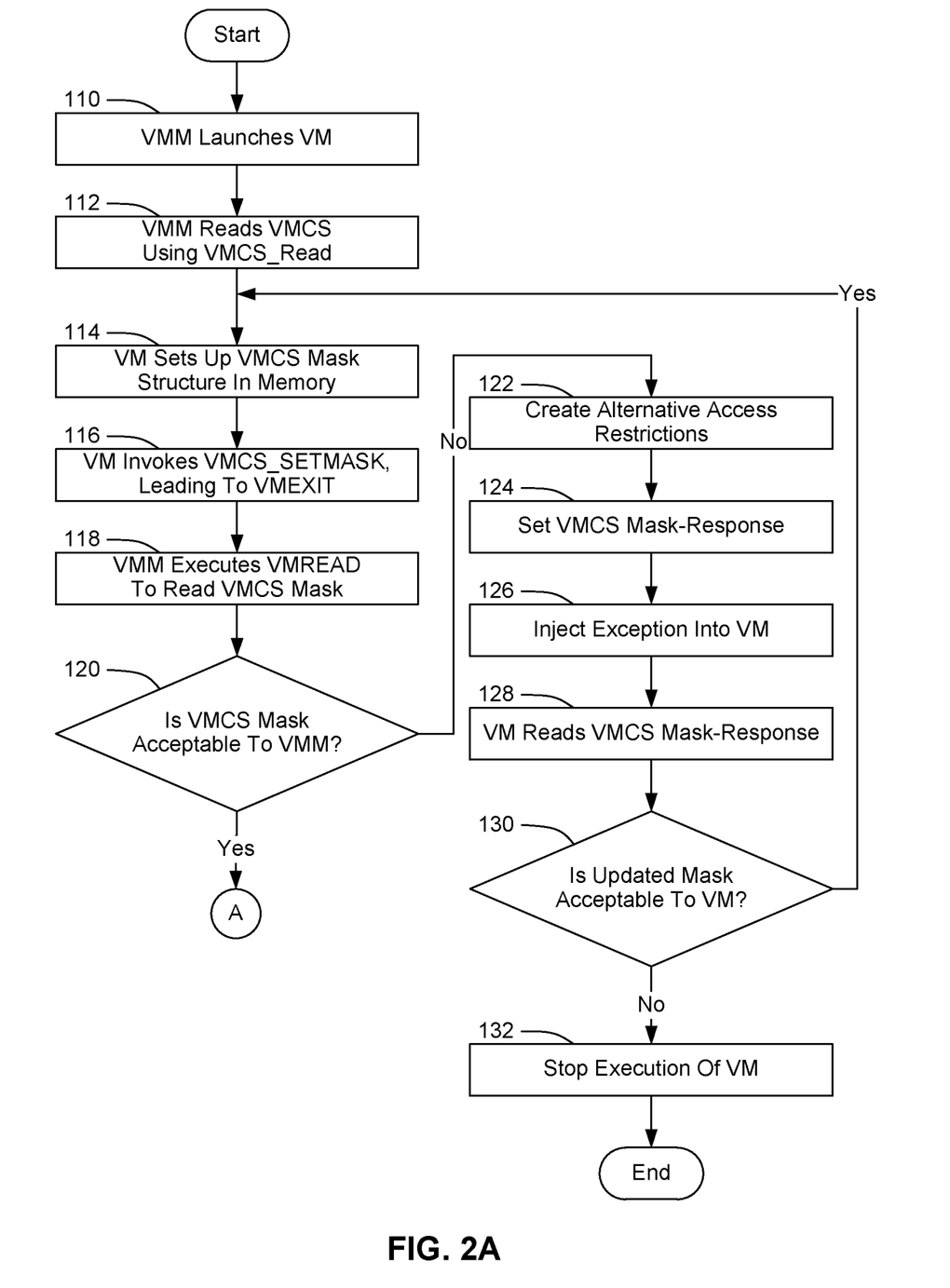
FIGS. 2A through 2B present a flowchart of an example embodiment of a process for securing data structures for controlling VMs.
Figure 2B:
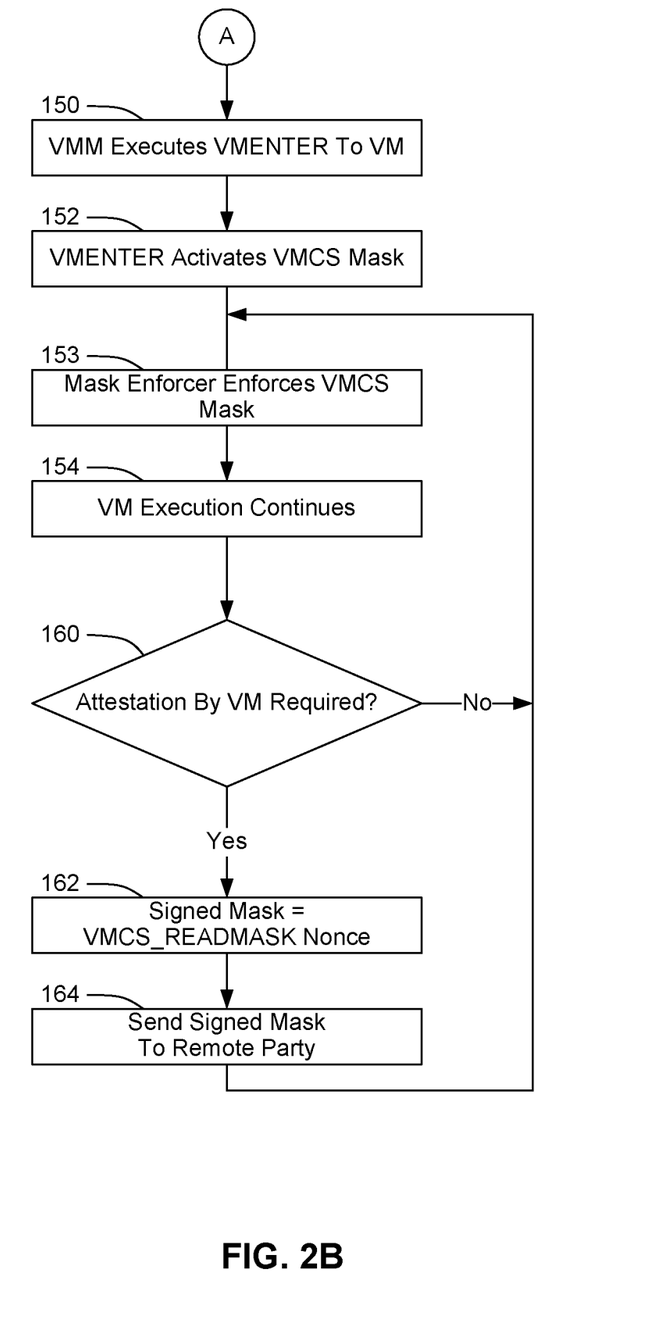

FIGS. 2A through 2B present a flowchart of an example embodiment of a process for securing data structures for controlling VMs. In particular, FIGS. 2A and 2B describe VM server 14 performing a process for securing VMCS 60, which is a data structure for controlling VM 50. The illustrated process starts with VMM 40 running, after VM server 14 has received domain image 51 from VM client 12.

As shown at block 110, VMM 40 loads guest software stack 52 into VM 50 and launches VM 50, in response to receiving domain image 51 from VM client 12. As indicated above, in addition to the software for performing the primary work desired by the VMSC, guest software stack 52 includes guest security manager 54. As shown at block 112, in response to VM 50 being launched, guest security manager 54 uses VMREAD to read VMCS 60 to determine the current state of VM 50. For instance, guest security manager 54 may determine that VMCS mask 68 has not been set yet, based on VMCS 60. As shown at block 114, in response to that determination, guest security manager 54 may then set up a preliminary copy of the VMCS mask in memory. As described in greater detail below with regard to FIGS. 3 and 4, that VMCS mask specifies access restrictions to be imposed on VMM 40, with respect to various different fields within VMCS 60. In one embodiment or scenario, processor 22 does not allow VM 50 to modify any fields of VMCS 60 with the VMWRITE instruction. However, processor 22 does allow VM 50 to execute the VMCS_SETMASK instruction. Accordingly, after storing the preliminary copy of the VMCS mask in memory, guest security manager 54 executes the VMCS_SETMASK instruction, as shown at block 116.

The VMCS_SETMASK instruction copies the data from the preliminary copy of the VMCS mask in memory into VMCS mask 68. The VMCS_SETMASK instruction also causes a VM exit. For purposes of this disclosure, the access restrictions that are requested by guest security manager 54 may be referred to as the proposed access restrictions.

As shown at block 118, in response to that VM exit, host security manager 44 then uses VMREAD to read VMCS mask 68 from VMCS 60. As shown at block 120, host security manager 44 than automatically determines whether the proposed access restrictions are acceptable to VMM 40. For instance, host security manager 44 may be configured with one or more predetermined host policy settings 46 that describe acceptable access restrictions, and host security manager 44 may determine whether the proposed access restrictions in VMCS mask 68 are more limiting than allowed by host policy settings 46. If the proposed access restrictions are too limiting, host security manager 44 may determine that the proposed access restrictions are not acceptable.

FIG. 3 is a block diagram depicting an example embodiment of VMCS mask 68 from a first perspective. In particular, FIG. 3 depicts VMCS mask 68 from a relatively abstract perspective, depicting that VMCS mask 68 identifies various different fields 80 within various different areas of VMCS mask 68, such as a GSA, an area for VM-execution control fields, etc. Moreover, FIG. 3 depicts that VMCS mask 68 specifies access rights 82 for each of those fields, to be imposed by mask enforcer 36 whenever VMM 40 attempts to access VMCS 60 (once guest security manager 54 and host security manager 44 have agreed). In particular, VMCS mask 68 specifies that some fields are to have no access (NA), some are to have read-only access (RO), some are to have write-only access (WO), and some are to have read-and-write access (RW).

FIG. 4 is a block diagram depicting an example embodiment of VMCS mask 68 from a second perspective. In particular, FIG. 4 depicts VMCS mask 68 from a less abstract perspective, providing additional details for one embodiment or scenario. In the embodiment of FIG. 4, VMCS mask 68 includes two substructures: VMCS.Mask.Read 90 and VMCS.Mask.Write 92. Mask enforcer 36 uses VMCS.Mask.Read 90 to determine whether or not to allow VMM 40 to read from a particular field of VMCS 60, and mask enforcer 36 uses VMCS.Mask-.Write 92 to determine whether or not to allow VMM 40 to write from a particular field of VMCS 60. For instance, for each field 94, a restriction value 96 of 0 may indicate not allowed, and a restriction value 96 of 1 may indicate allowed.

VMM 40 and VM 50 may use the structures of FIG. 4 to implement the restrictions illustrated in FIG. 3. For instance, to specify NA for Field A in the GSA (as illustrated in FIG. 3), guest security manager 54 may specify the restriction value of 0 for Field A in the GSA in both VMCS.Mask.Read 90 and VMCS.Mask.Write 92 (as illustrated in FIG. 4).

Referring again to block 120 of FIG. 2A, in one scenario for example, the proposed access restrictions may include a first access restriction (or set of access restrictions) to set all of the fields in the GSA as NA and a second access restriction (or set of access restrictions) to set all of the fields in the VM-Exit Information as RO. Also, predetermined host policy settings 46 may include a first setting which specifies that one particular field in the GSA must at least be readable and a second setting (or set of settings) which specifies that all fields in the HSA must be RW. In such a scenario, host security manager 44 may determine that the proposed access restrictions are not acceptable.

If host security manager 44 determines that the proposed access restrictions are acceptable, the illustrated process may pass from block 120 through page connector A to block 150 of FIG. 2B, with processing to proceed as described below.

However, if host security manager 44 determines that the proposed access restrictions are not acceptable, host security manager 44 may propose alternative access restrictions for acceptance by guest security manager 54. In particular, as shown at block 122, host security manager 44 may create or select the alternative access restrictions, based on the original proposed access restrictions and host policy settings 46. As shown at block 124, host security manager 44 may then use VMWRITE to write those alternative access restrictions into VMCS mask-response 70 in VMCS 60. As shown at block 126, host security manager 44 then injects an exception into VM 50.

As shown at block 128, when VM 50 resumes, guest security manager 54 reads VMCS mask-response 70 to obtain the alternative access restrictions. As shown at block 130, guest security manager 54 then determines whether the alternative access restrictions are acceptable to VM 50. For instance, guest security manager 54 may be configured with guest policy settings 56 that describe acceptable access restrictions for VM 50, and guest security manager 54 may determine whether the alternative access restrictions in VMCS mask response 70 are at least as limiting as required by the guest policy settings 56. If the alternative access restrictions are not sufficiently limiting, guest security manager 54 may determine that the alternative access restrictions (i.e., the updated mask) are not acceptable to VM 50.

As shown at block 132, if host security manager 44 did not accept the access restrictions proposed by guest security manager 54 and guest security manager 54 does not accept the alternative access restrictions proposed by host security manager 44, guest security manager 54 causes VM 50 to stop executing. The illustrated process may then end.

However, if the alternative access restrictions are acceptable to guest security manager 54, the process may return to block 114 from block 130. Guest security manager 54 may then copy the alternative access restrictions into memory (e.g., replacing the preliminary copy of the VMCS mask that was created earlier). As shown at block 116, guest security manager 54 may then execute VMCS_SETMASK again. As indicated above, VMCS_SETMASK copies the access restrictions into VMCS mask 68 and causes a VM exit.

As shown at blocks 118 and 120 and described above, host security manager 44 then reads VMCS mask 68 and determines whether the access restrictions specified therein are acceptable. That determination should be positive at this point, since the access restrictions in VMCS mask 68 should now match the alternative access restrictions that were proposed by host security manager 44, as indicated above. The illustrated process may then pass through page connector A to FIG. 2B.

As shown at block 150, VMM 4 then executes a VM enter to resume VM 50. As shown at block 152, that VM enter activates mask enforcer 36.

As shown at block 153, mask enforcer 36 thereafter uses the access restrictions from VMCS mask 68 to control access to VMCS 60 by VMM 40, automatically preventing VMM 40 from performing any type of access that is not allowed by those access restrictions. For instance, if VMCS mask 68 specifies NA or RO access for all of the fields in the GSA, mask enforcer 36 will automatically prevent VMM 40 from writing to any of those fields. Accordingly, mask enforcer 36 enforces VMCS mask 68 on every VMX transition.

As shown at block 154, VM 50 may then continue executing guest software stack 52, with VMCS mask 68 and mask enforcer 36 preventing VMM 40 from performing any disallowed access to VMCS 60. For instance, various VM exits and VM entries may cause control to pass between VM 50 and VMM 40 while VM 50 is running (i.e., while VM 50 has not been terminated), and whenever VMM 40 has control, mask enforcer 36 prevents VMM 40 from performing any disallowed access to VMCS 60.

In addition, as shown at block 160, guest security manager 54 may determine whether attestation by VM 50 is required or desired. For instance, VM 50 may be interacting with a remote party on behalf of the VMSC, and that remote party may have requested attestation of VMCS mask 68 for assurance concerning the trustworthiness of VM 50. If attestation is not required, the process may return to block 153, with execution of VM 50 continuing.

However, if attestation is required, guest security manager 54 may use VMCS_CERTIFYMASK to generate a digitally signed version of VMCS mask 68, as shown at block 162. Referring again to FIG. 1, the digitally signed version of VMCS mask 68 is illustrated as signed mask 58. VMCS_CERTIFYMASK may use any suitable attestation method to generate signed mask 58. For instance, the remote party may have provided VM 50 with a nonce, and guest security manager 54 may supply that nonce as an argument to VMCS_CERTIFYMASK. VMCS_CERTIFYMASK may then use that nonce and a signing key for VM server 14 to generate signed mask 58. In addition, VMCS_CERTIFYMASK may use a key or a certificate from another remote device, such as a remote attestation authority, to generate signed mask 58. That key or certificate may be referred to as a third-party key or certificate, and it may attest to the trustworthiness of VM server 14 or a portion of VM server 14, such as VMM 40 or VM 50. As shown at block 164 of FIG. 2B, host security manager 44 may then send signed mask 58 to the party that requested attestation. The process may then return to block 153, with VM 50 continuing to execute.

As has been described, a VM server may include technology which provides security for a VMCS. For instance, that technology may prevent a VMM from modifying the GSA of a VMCS. Additionally, that technology may allow for utilization of a VMM that is not tied to any specific VMCS access restrictions, whether defined in advance by the VMM or by the VM. Instead, the VMM can adapt dynamically to different access restrictions, and can propose alternative access restrictions through negotiated with the VM at startup. The technology described herein also allows for the creation of a VM that is not tied to any specific VMM with specific, predetermined access restrictions. Instead, the VM can run under any VMM that is equipped to handle a VMCS mask, as long as the VM and the VMM can agree to acceptable access restrictions. By contrast, if a VMM is not equipped to negotiate and enforce VMCS masks, a VM that expects the VMM to enforce a VMCS mask might crash under that VMM. Moreover, if a VMM is equipped to negotiate and enforce VMCS masks, and if that VMM were to try to launch a VM which requires access restrictions that are more restrictive than the VMM allows, the VM will not crash. Instead, the VMM will simply refuse to run that VM.

Although certain example embodiments are described herein, one of ordinary skill in the art will understand that those example embodiments may easily be divided, combined, or otherwise altered to implement additional embodiments. Likewise, expressions such as "an embodiment," "one embodiment," and "another embodiment" are meant to generally reference embodiment possibilities. Those expressions are not intended to limit the invention to particular embodiment configurations. As used herein, those expressions may reference the same embodiment or different embodiments, and those embodiments are combinable into other embodiments. In light of the principles and example embodiments described and illustrated herein, it will be recognized that the illustrated embodiments can be modified in arrangement and detail without departing from such principles.

Also, embodiments have been described herein with regard to certain instruction names, field names, values, etc. Those particular names and values may typically be used in association with one or more particular types or brands of processors. However, other kinds of processors may support the same kinds of features, even though the manufacturers of those processors may use different terminology. Accordingly, for purposes of this disclosure, terms like VMREAD, VMWRITE, VMX operation, root mode, non-root mode, etc., should be understood as encompassing the features described herein, rather than as being limited to products from a particular manufacturer. For instance, in general, VMCS should be understood as denoting a data structure, or combination of data structures, with data (e.g., guest state data and host state data) for managing a VM. A VMCS may also be referred to as a virtual machine control block (VMCB), a virtual machine control data structure (VMCDS), etc. Similarly, VMREAD and VMWRITE should be understood as denoting instructions that enable software to read and write a VMCDS. A VMREAD instruction may also be referred to using terms such as VMCSRead, VRead, etc. Likewise, a VMWRITE instruction may also be referred to as VMCSWrite, VWrite, etc. Likewise, a VMCS_SETMASK instruction may also be referred to as a set-mask instruction, etc. Likewise, a VMCS_CERTIFYMASK instruction may be referred to as a VMCS_READMASK instruction, a read-mask instruction, a certify-mask instruction, a sign-mask instruction, etc.

Also, different embodiments may use different specific values to denote settings such as on and off, read-allowed, write-allowed, etc. For instance, a value of 0 in a particular data structure may be used to indicate that read is allowed, and a value of 1 may be used to indicate that read is not allowed. Also, for purposes of this disclosure, the different parts of a processor which enable the processor to perform the operations described herein with regard to virtualization may be referred to in general as virtualization technology. Thus, virtualization technology includes, without limitation, the instruction decoder that recognizes and dispatches instructions pertaining to virtualization (e.g., VMPTRLD, VRead, VWrite, etc.), as well as the control logic that the processor uses to execute such instructions. The control logic within a processor to which an instruction decoder dispatches an instruction for execution may be referred to as an execution unit. For instance, an instruction decoder may dispatch set-mask instructions to a set-mask execution unit and certify-mask instructions to a certify-mask execution unit.

As described above, a device may include instructions and other data which, when accessed by a processor, cause the device to perform particular operations. For purposes of this disclosure, instructions which cause a device to perform operations may be referred to in general as software. Software and the like may also be referred to as control logic. Software that is used during a boot process may be referred to as firmware. Software that is stored in nonvolatile memory may also be referred to as firmware. Software may be organized using any suitable structure or combination of structures. Accordingly, terms like program and module may be used in general to cover a broad range of software constructs, including without limitation application programs, subprograms, routines, functions, procedures, drivers, libraries, data structures, processes, microcode, and other types of software components. Also, it should be understood that a software module may include more than one component, and those components may cooperate to complete the operations of the module. Also, the operations which the software causes a device to perform may include creating an operating context, instantiating a particular data structure, etc. Any suitable operating environment and programming language (or combination of operating environments and programming languages) may be used to implement software components described herein.

A medium which contains data and which allows another component to obtain that data may be referred to as a machine-accessible medium or a machine-readable medium. In one embodiment, software for multiple components is stored in one machine-readable medium. In other embodiments, two or more machine-readable media may be used to store the software for one or more components. For instance, instructions for one component may be stored in one medium, and instructions another component may be stored in another medium. Or a portion of the instructions for one component may be stored in one medium, and the rest of the instructions for that component (as well instructions for other components), may be stored in one or more other media. Similarly, software that is described above as residing on a particular device in one embodiment may, in other embodiments, reside on one or more other devices. For instance, in a distributed environment, some software may be stored locally, and some may be stored remotely. Similarly, operations that are described above as being performed on one particular device in one embodiment may, in other embodiments, be performed by one or more other devices.

Accordingly, alternative embodiments include machine-readable media containing instructions for performing the operations described herein. Such media may be referred to in general as apparatus and in particular as program products. Such media may include, without limitation, tangible non-transitory storage components such as magnetic disks, optical disks, RAM, read-only memory (ROM), etc., as well as processors, controllers, and other components that include data storage facilities. For purposes of this disclosure, the term "ROM" may be used in general to refer to nonvolatile memory devices such as erasable programmable ROM (EPROM), electrically erasable programmable ROM (EEPROM), flash ROM, flash memory, etc.

It should also be understood that the hardware and software components depicted herein represent functional elements that are reasonably self-contained so that each can be designed, constructed, or updated substantially independently of the others. In alternative embodiments, many of the components may be implemented as hardware, software, or combinations of hardware and software for providing the functionality described and illustrated herein. In some embodiments, some or all of the control logic for implementing the described operations may be implemented in hardware logic (e.g., as microcode in an integrated circuit chip, as a programmable gate array (PGA), as an application-specific integrated circuit (ASIC), etc.).

Additionally, the present teachings may be used to advantage in many different kinds of data processing systems. Such data processing systems may include, without limitation, accelerators, systems on a chip (SOCs), wearable devices, handheld devices, smartphones, telephones, entertainment devices such as audio devices, video devices, audio/video devices (e.g., televisions and set-top boxes), vehicular processing systems, personal digital assistants (PDAs), tablet computers, laptop computers, portable computers, personal computers (PCs), workstations, servers, client-server systems, distributed computing systems, supercomputers, high-performance computing systems, computing clusters, mainframe computers, mini-computers, and other devices for processing or transmitting information. Accordingly, unless explicitly specified otherwise or required by the context, references to any particular type of data processing system (e.g., a PC) should be understood as encompassing other types of data processing systems, as well. A data processing system may also be referred to as an apparatus. The components of a data processing system may also be referred to as apparatus.

Also, unless expressly specified otherwise, components that are described as being coupled to each other, in communication with each other, responsive to each other, or the like need not be in continuous communication with each other and need not be directly coupled to each other. Likewise, when one component is described as receiving data from or sending data to another component, that data may be sent or received through one or more intermediate components, unless expressly specified otherwise. In addition, some components of the data processing system may be implemented as adapter cards with interfaces (e.g., a connector) for communicating with a bus. Alternatively, devices or components may be implemented as embedded controllers, using components such as programmable or non-programmable logic devices or arrays, ASICs, embedded computers, smart cards, and the like. For purposes of this disclosure, the term "bus" includes pathways that may be shared by more than two devices, as well as point-to-point pathways. Similarly, terms such as "line," "pin," etc. should be understood as referring to a wire, a set of wires, or any other suitable conductor or set of conductors. For instance, a bus may include one or more serial links, a serial link may include one or more lanes, a lane may be composed of one or more differential signaling pairs, and the changing characteristics of the electricity that those conductors are carrying may be referred to as signals on a line. Also, for purpose of this disclosure, the term "processor" denotes a hardware component that is capable of executing software. For instance, a processor may be implemented as a central processing unit (CPU), a processing core, or as any other suitable type of processing element. A CPU may include one or more processing cores, and a device may include one or more CPUs.

Also, although one or more example processes have been described with regard to particular operations performed in a particular sequence, numerous modifications could be applied to those processes to derive numerous alternative embodiments of the present invention. For example, alternative embodiments may include processes that use fewer than all of the disclosed operations, process that use additional operations, and processes in which the individual operations disclosed herein are combined, subdivided, rearranged, or otherwise altered.

In view of the wide variety of useful permutations that may be readily derived from the example embodiments described herein, this detailed description is intended to be illustrative only, and should not be taken as limiting the scope of coverage.

What is claimed is:

1. A processor with technology to secure a virtual machine control data structure, the processor comprising:
   virtualization technology which, when the processor is installed in a data processing system, enables the processor to:
      run a virtual machine monitor (VMM) in the data processing system; and
      run guest software in the data processing system in a virtual machine (VM) that is managed by the VMM, wherein the VM is based at least in part on a virtual machine control data structure (VMCDS) for the VM;
   an instruction decoder to recognize and dispatch a set-mask instruction, wherein the set-mask instruction specifies access restrictions to be imposed on the VMM with respect to the VMCDS of the VM; and a mask enforcer to automatically enforce the access restrictions specified by the set-mask instruction, in response to an attempt by the VMM to access the VMCDS of the VM.

2. A processor according to claim 1, wherein the processor is configured to allow VMs to utilize the set-mask instruction to specify access restrictions to be imposed on the VMM.

3. A processor according to claim 1, wherein the set-mask instruction is to enable the VM to specify a first access restriction for a first part of the VMCDS and a second access restriction for a second part of the VMCDS.

4. A processor according to claim 3, wherein the mask enforcer is to (a) automatically enforce the first access restriction in response to the VMM attempting to access the first part of the VMCDS and (b) automatically enforce the second access restriction in response to the VMM attempting to access the second part of the VMCDS.

5. A processor according to claim 3, wherein the set-mask instruction and the mask enforcer are to provide for at least three different types of access rights from the group consisting of:
read-only access;
write-only access;
read-and-write access; and
no access.

6. A processor according to claim 1, further comprising:
the instruction decoder to recognize and dispatch a certify-mask instruction, wherein the certify-mask instruction, when executed, generates a digitally signed copy of the access restrictions specified by the set-mask instruction.

7. A data processing system with technology to secure a virtual machine control data structure, the data processing system comprising:
random access memory (RAM);
a processor in communication with the RAM;
virtualization technology in the processor that enables the processor to:
run a virtual machine monitor (VMM) in the data processing system; and
run guest software in the data processing system in a virtual machine (VM) that is managed by the VMM, wherein the VM is based at least in part on a virtual machine control data structure (VMCDS) for the VM;
an instruction decoder in the processor, the instruction decoder to recognize and dispatch a set-mask instruction, wherein the set-mask instruction specifies access restrictions to be imposed on the VMM with respect to the VMCDS of the VM; and
a mask enforcer in the processor, the mask enforcer to automatically enforce the access restrictions specified by the set-mask instruction, in response to an attempt by the VMM to access the VMCDS of the VM.

8. A data processing system according to claim 7, wherein the processor is configured to allow VMs to utilize the set-mask instruction to specify access restrictions to be imposed on the VMM.

9. A data processing system according to claim 7, wherein the set-mask instruction provides for a first access restriction for a first part of the VMCDS and a second access restriction for a second part of the VMCDS.

10. A data processing system according to claim 9, wherein:
the mask enforcer is to (a) automatically enforce the first access restriction in response to the VMM attempting to access the first part of the VMCDS and (b) automatically enforce the second access restriction in response to the VMM attempting to access the second part of the VMCDS; and
the set-mask instruction and the mask enforcer are to provide for at least three different types of access rights from the group consisting of:
read-only access;
write-only access;
read-and-write access; and
no access.

11. A data processing system according to claim 7, further comprising:
the instruction decoder to recognize and dispatch a certify-mask instruction, wherein the certify-mask instruction, when executed, enables the data processing system to generate a digitally signed copy of the access restrictions specified by the set-mask instruction.

12. An apparatus to provide security for a virtual machine control data structure, the apparatus comprising:
a non-transitory machine-readable medium; and
instructions in the machine-readable medium to implement a host security manager for a virtual machine monitor (VMM) in a data processing system, wherein the host security manager, when executed, enables the VMM to perform operations comprising:
after a virtual machine (VM) in the data processing system has executed a set-mask instruction on a processor of the data processing system, wherein the set-mask instruction proposes access restrictions to limit access by the VMM to a virtual machine control data structure (VMCDS) of the VM, and after the VM has passed control to the VMM, automatically determining whether the proposed access restrictions are acceptable to the VMM; and
in response to a determination that the proposed access restrictions are acceptable to the VMM, allowing the VMM to run in the data processing system while a mask enforcer in the processor automatically enforces the access restrictions to limit access by the VMM to the VMCDS of the VM.

13. An apparatus according to claim 12, wherein the operations that the host security manager enables the VMM to perform further comprise:
in response to a determination that the proposed access restrictions are not acceptable to the VMM, automatically proposing alternative access restrictions for consideration by the VM.

14. An apparatus according to claim 13, wherein the operation of automatically proposing alternative access restrictions for consideration by the VM comprises writing the alternative access restrictions to a mask-response data structure in the VMCDS of the VM.

15. An apparatus according to claim 13, wherein the operation of automatically proposing alternative access restrictions for consideration by the VM comprises injecting an exception into the VM.

16. An apparatus according to claim 13, further comprising instructions in the machine-readable medium to implement a guest security manager, wherein the guest security manager, when executed in the VM, enables to VM to perform operations comprising:
executing the set-mask instruction to propose access restrictions to limit access by the VMM to the VMCDS of the VM; and after the VMM has proposed alternative access restrictions for consideration by the VM, automatically determining whether the alternative access restrictions are acceptable to the VM.

17. An apparatus according to claim 16, wherein the guest security manager, when executed, enables the VM to obtain the alternative access restrictions from a mask-response data structure in the VMCDS of the VM.

18. An apparatus according to claim 16, wherein the guest security manager, when executed, enables the VM to respond to a determination that the alternative access restrictions are acceptable to the VM by executing a second set-mask instruction to adopt the alternative access restrictions.

19. An apparatus according to claim 18, wherein the guest security manager, when executed, further enables the VM to execute a certify-mask instruction to generate a digitally signed version of the access restrictions used to control VMM access to the VMCDS.

20. An apparatus according to claim 19, wherein the guest security manager, when executed, enables the VM to generate the digitally signed version of the access restrictions, based at least in part on a nonce from a remote data processing system.

* * * * *